US008124660B2

(12) United States Patent
de Figueiredo Gomes et al.

(10) Patent No.: US 8,124,660 B2
(45) Date of Patent: Feb. 28, 2012

(54) POLYMER ELECTROLYTE MEMBRANE COMPRISING COORDINATION POLYMER

(75) Inventors: Dominique de Figueiredo Gomes, Apensen (DE); Suzana Nunes, Geesthacht (DE); Klaus-Viktor Peinemann, Geesthacht (DE); Stefan Kaskel, Dresden (DE); Volker Abetz, Aumuhle (DE)

(73) Assignees: Gkss-Forshungszentrum Geesthacht GmbH, Geesthacht (DE); Technische Universitat Dresden, Dresden (DE)

( * ) Notice: Subject to any disclaimer, the term of this patent is extended or adjusted under 35 U.S.C. 154(b) by 122 days.

(21) Appl. No.: 12/124,220

(22) Filed: May 21, 2008

(65) Prior Publication Data
US 2008/0261101 A1 Oct. 23, 2008

Related U.S. Application Data

(63) Continuation of application No. PCT/EP2006/008799, filed on Sep. 9, 2006.

(30) Foreign Application Priority Data

Nov. 25, 2005 (DE) .......................... 10 2005 056 564

(51) Int. Cl.
*C08J 5/20* (2006.01)
*B01J 41/12* (2006.01)
*H01M 8/10* (2006.01)
(52) U.S. Cl. ................. 521/27; 521/30; 521/31; 521/32; 521/33; 429/492
(58) Field of Classification Search ................. 521/27, 521/30–33; 429/33, 492
See application file for complete search history.

(56) References Cited

U.S. PATENT DOCUMENTS

| 4,504,684 | A |  | 3/1985 | Fox et al. |
| 4,584,359 | A |  | 4/1986 | Sterzel et al. |
| 5,176,724 | A | * | 1/1993 | Saito et al. ........................ 96/13 |
| 5,422,411 | A |  | 6/1995 | Wei et al. |
| 5,679,482 | A |  | 10/1997 | Ehrenberg et al. |
| 6,059,943 | A |  | 5/2000 | Murphy et al. |
| 6,087,032 | A |  | 7/2000 | Yoshitake et al. |
| 6,387,230 | B1 | * | 5/2002 | Murphy et al. ............... 204/296 |
| 6,624,318 | B1 |  | 9/2003 | Muller et al. |
| 2002/0094466 | A1 | * | 7/2002 | Kerres et al. .................... 429/33 |

FOREIGN PATENT DOCUMENTS

DE 3407148 A1 8/1985
WO 03/102000 A1 12/2003

OTHER PUBLICATIONS

Kitagawa et al. Highly proton-conductive copper coordination polymer, H2dtoaCu (H2dtoa = dithiooxamide anion), Inorganic Chemistry Communication, 6 (2003), 346-348.*
Souzy et al. "Functional fluoropolymers for fuel cell membranes", Solid State Ionics, 176 (2005), 2839-2848 (www.sciencedirect.com).*
German Examination Report. Sep. 6, 2006.

* cited by examiner

*Primary Examiner* — Michael M Bernshteyn
(74) *Attorney, Agent, or Firm* — Michaud-Kinney Group LLP

(57) ABSTRACT

A polymer electrolyte membrane is made from a polymer electrolyte and a coordination polymer, and finds use in a fuel cell. The polymer electrolyte membrane may be made by dissolving a polymer electrolyte in a solvent to provide a first solution, adding a coordination polymer to the first solution to yield a second solution, and forming the second solution into a film.

9 Claims, 1 Drawing Sheet

POLYMER ELECTROLYTE MEMBRANE COMPRISING COORDINATION POLYMER

CROSS REFERENCE TO RELATED APPLICATION

This application is a continuation of International Application PCT/EP2006/008799, which has an international filing date of Sep. 9, 2006 and which was published on May 31, 2007 in German in International publication number WO 2007/059815, and which is hereby incorporated herein in its entirety, and which claims priority on German patent application no. 102005056564.6 filed Nov. 25, 2005.

FIELD OF THE INVENTION

The invention relates to a polymer electrolyte membrane, in particular of a fuel cell, as well as the use of a polymer electrolyte membrane. Moreover, the invention relates to a method for the production of an, in particular proton-conductive, polymer electrolyte membrane, preferably of a fuel cell.

BACKGROUND

Fuel cells are considered a forward-looking, low-emission alternative to conventional energy generation methods. The polymer electrolyte membrane fuel cell (PEM) is of particular interest for mobile applications. A proton-conductive polymer membrane is the central component in this type of fuel cell. Nafion®, which is a perfluorinated polymer with sulfonic-acid side groups made by DuPont, and similar products from Asahi continue to be the dominant membrane materials for this purpose.

There are numerous examinations of the use of other polymers as membrane materials in fuel cells. However, these polymers are almost exclusively sulfonated materials, the proton conductivity of which can be attributed to sulfonic-acid groups.

The synthesis of perfluorinated polymers with phosphonic-acid side groups, based on perfluorovinyloxy-substituted phosphonic acids as monomers, which are then copolymerized with tetrafluoroethylene and perfluoropropylvinylether, are described in the publication (M. Yamabe, K. Akiyama, Y. Akatsuka, M. Kato. Novel phosphonated perfluorocarbon polymers. Eur. Polym. J. 36 (2000) 1035-41). The use of these types of polymers in fuel cells is described in U.S. Pat. No. 6,087,032.

Other fuel cell membranes from polymers with phosphonic-acid side groups are described for example in U.S. Pat. No. 5,422,411. Other polymers for use in fuel cells are described in U.S. Pat. No. 5,679,482. These are fluorine-free styrene copolymers with a mixed functionalization of sulfonic-acid and phosphonic-acid groups.

Polymer electrolyte membrane fuel cells (PEM fuel cells) consist of two electrodes, which are separated from each other by a proton-conducting membrane (polymer electrolyte membrane or proton exchange membrane). The electrodes consist e.g. of carbon mats, which are steamed with platinum and connected with each other via an exterior electric circuit. So that a conversion from hydrogen and oxygen to water can take place, the proton-conducting membrane must be moistened. Hydrogen fuel is constantly supplied to the anode. The cathode is constantly supplied with oxygen. Two types of PEM fuel cells are in development: low-temperature cells (up to approx. 90° C.) and high-temperature cells (up to approx. 180° C.).

The low-temperature cell was developed in the 60 s. Back then, a sulfonated polystyrene membrane served as the electrolyte. Since 1969, the Nafion® membrane developed by DuPont has been installed in the PEM fuel cells. Low-temperature cells react sensitively to carbon monoxide (CO). This gas can block the anode catalyst, which leads to a loss of power. The membrane must be moistened so that protons can be conducted.

High-temperature cells react insensitively to CO and other impurities. Higher working temperatures in the cell are interesting for the house energy since they enable a more effective use of the generated heat. Since the membrane conducts protons without water, it does not need to be moistened.

There are already suggested solutions with respect to the membranes for high-temperature cells. For example, U.S. Pat. No. 6,387,230 B1 suggests for high-temperature cells a series of membranes, which consist of a combination of polymers and organic or inorganic materials (inorganic-organic composite membranes).

SUMMARY

The present invention resides in one aspect in a polymer electrolyte membrane made from a polymer electrolyte and a coordination polymer.

The present invention resides in another aspect in an improvement to a fuel cell that contains a polymer electrolyte membrane, the improvement comprising that the polymer electrolyte membrane comprises a polymer electrolyte and a coordination polymer.

The present invention resides in yet another aspect in method for the production of a polymer electrolyte membrane. The method includes dissolving a polymer electrolyte in a solvent to provide a first solution, adding a coordination polymer to the first solution to yield a second solution, and forming the second solution into a film.

BRIEF DESCRIPTION OF THE DRAWINGS

The sole FIGURE is a plot of the relationship of proton conductivity to temperature in three polymer electrolyte compositions, indicating proton conductivity on the vertical axis and temperature on the horizontal axis.

DETAILED DESCRIPTION

Figure 1:
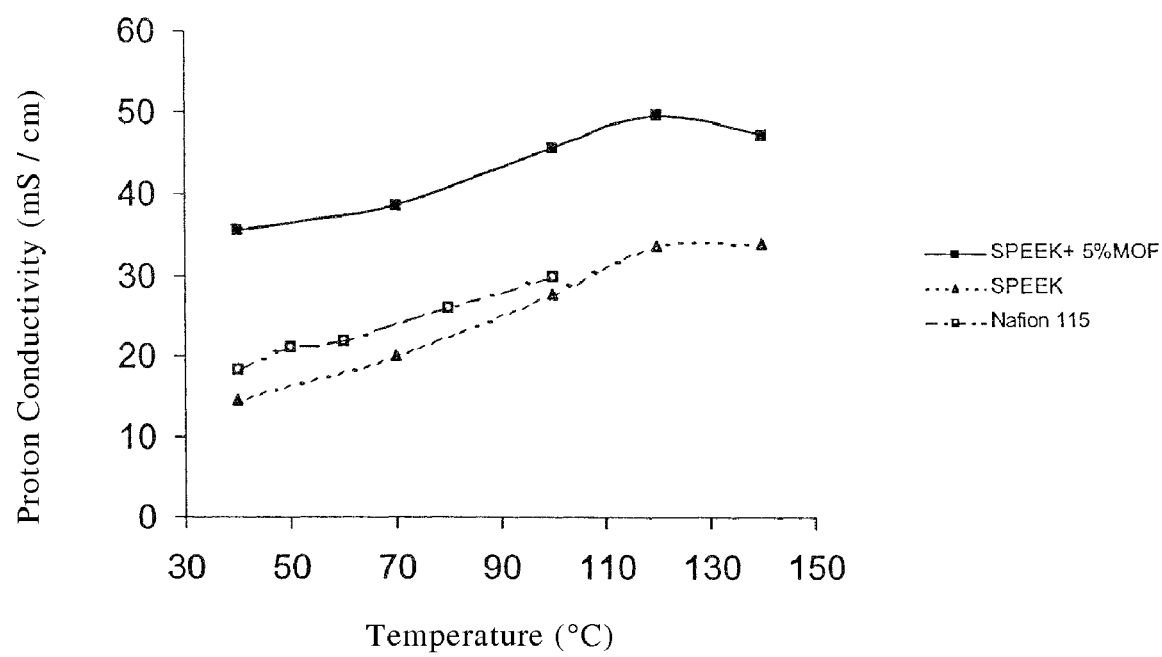

The present invention provides a novel proton-conducting or proton-conductive membrane for electrochemical applications, which is made of a polymer/MOF mixture (MOF: Metal Organic Frameworks) and is suitable for the high-temperature cells.

According to the invention, the proton conductivity of known polymer electrolytes can be increased considerably at higher temperatures through the mixture of MOFs.

In order to produce the membrane according to the invention, a polymer, e.g. made of sulfonated poly(ether ether ketone), i.e. SPEEK, is first dissolved in a polar, organic solvent. Fine-crystalline MOF particles are then added to this solution. After casting, the composite membranes produced in this manner are dried.

The decisive advantage of the present invention is the fact that composite membranes using MOFs were not used as the membrane for PEM fuel cells. Moreover, at an increased temperature, the proton conductivity of the membrane according to the invention is higher than for conventional membranes, e.g. made of Nafion®.

Through the addition of coordination polymers to polymers otherwise standard for the membrane production, polymer electrolyte membranes can be produced with new properties. These properties enable a high permeability and a high selectivity in a membrane made of it. When a coordination polymer, which is an organometallic framework structure with permanent porosity, is added to the first polymer, the gas permeability of the composite material or a corresponding composite membrane can be increased at the same thickness compared to conventional membranes. This is due to a relatively large, accessible volume on the inside of the composite material, brought about by the porosity of the organometallic framework structure (hereinafter referred to as MOF).

The coordination polymer is preferably available in crystal form, in particular in crystal clusters. The crystal clusters preferably have an extension of approximately 0.1 μm to 50 μm and especially preferably of 0.4 μm to 10 μm. With a composite membrane, the extension is preferably in the range of 0.1 μm to 1 μm, in particular 0.5 μm. The coordination polymer is preferably catalytically active. The selectivity can be increased correspondingly when using a corresponding sorption-selective framework structure. In the case of corresponding coordination polymers or organometallic framework structures (MOF of Metal Organic Frameworks), polymers are provided, which comprise main chains made of many low-molecular ligands, which are held together by metal complexes and thus by coordinative or ionic bonds. The removal of the metal centers in the coordination polymers normally goes along with the degradation of the polymer chains for low-molecular products.

The membrane preferably has covalently bonded, negatively charged functional groups. That is, the membrane has a polyelectrolyte layer, wherein its ionic groups are bonded to perfluorinated and/or hydrocarbon-based polymer frames or polymers.

Specific polymers, which can be used as the membrane for the, in particular proton-conducting, polymer electrolytes, include Nafion® and/or, in particular sulfonated, phosphonated or doped, poly(amide imide), poly(ether sulfone), poly(ether ether ketone), poly(ether ketone ketone), poly(ether imide), poly(phosphazene), poly(phenoxy benzoyl phenylene), poly(benzimidazole) and poly(azole).

For this, the membrane polymer has acid-conductive groups, e.g. sulfone carboxyl, phosphone, sulfonimide or boric-acid groups. The polymers made of poly(amide imide), poly(ether sulfone), poly(ether ether ketone), poly(ether imide), poly(phosphazene) and poly(phenoxy benzyl phenylene) thereby comprise sulfone, carboxyl, phosphone or sulfonimide groups. The polymer made of poly(benziamidazole) or poly(azole) can comprise sulfone, carboxyl, phosphone, sulfonimide or boric acid groups.

A particularly preferred polymer material is sulfonated poly(ether ether ketone), SPEEK, which has the repetition units of the following structure:

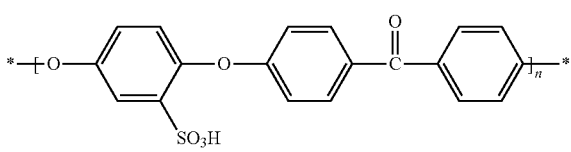

The preferred sulfonation level of SPEEK is less than 70%, in particular less than 60% and preferably less than 50%. Studies show that SPEEK membranes with a sulfonation level of approx. 50% have better performance with direct methanol fuel cells (DMFC) compared to Nafion® (see Yang B., Manthiram A., Sulfonated Poly(ether ether ketone) membranes for direct methanol fuel cells. Electrochemical and Solid-State Letters 6 (2003) A229-A231).

The preferred fine-porous particles are particles of a coordination polymer, i.e. a so-called metal organic framework (MOF). The coordination polymers or the MOFs are made of an organic linker and a transition metal or cluster, wherein both units form blocks with a three-dimensional open framework structure. Their synthesis from molecularly formed blocks offers the potential for a targeted modification of its properties, which can be determined through the metal, the bond or a connecting ligand. The size and the chemical environment of the created hollow areas are defined by the length and the functionalities of the organic unit.

Known substance classes of porous solids are called metal organic frameworks (MOFs) or coordination polymers. The theory of coordination bonds developed by Alfred Werner [A. Werner, Z. Anorg. Allg. Chem. 3 (1893) 267] made it possible for the first time to understand the experimental results of complex inorganic chemistry. Stable MOFs are obtained by adding organic molecules capable of complex formation like diamines or diacids to dissolved salts. The distances between the lattice points given by the metal ions as coordination centers can be set in a wide range through the structure, in particular of the organic components, and result in micro- to mesoporous substances. The separation distance of the functional groups of the organic components mainly specifies the pore size; the type of metallic component(s) decides potential catalytic properties. MOFs or coordination polymers can thus be varied and are substantially documented [S. Kitagawa, et al. Angew. Chem. Int. Ed. 43 (2004) 2334].

Due to the structure of the coordination polymer, the large, internal volume can be used for the sorption and condensation of gases and steam. Other possible uses result from the metal component of the MOFs. The catalytic properties of metals or metal salts also remain intact or change during the chemical conversion to MOFs. Improved catalytic properties can also be created through the easily accessible inner surface. MOFs are generally temperature-resistant up to >300° C. and have low densities of 0.8 to 0.2 g/cm$^3$ depending on the lattice distance or pore size. MOFs with catalytic properties are described e.g. as catalysts for the hydroformylation and hydration [Fox and Pesa, U.S. Pat. No. 4,504,684] or the epoxidation [Müller, et al. U.S. Pat. No. 6,624,318 B1].

Since the MOFs consist of inorganic salts and organic bonds, e.g. diamines and diacides, the compatibility with elastomers and vitreous polymers is a lot greater than with pure inorganic substances like zeolites and carbon molecular sieves. Up until now, this class of bonds has not yet been added to polymers and the compatibility or the changed properties were examined with respect to gas permeability and selectivity.

MOFs with pore sizes between 0.3 nm to 1.5 nm are preferred since MOFs with larger pores have centers which are available for organic modifications or functionalization, whereby the proton transport is promoted.

Preferred bivalent transition metals are Zn, Cu Co, Ni, Cd, Fe, Mo, Rh and Mn. However, trivalent Al (aluminum) and tetravalent or pentavalent V (vanadium) are also important.

Preferred organic linkers, which are used for the synthesis of MOFs, are:

i) phosphonate, for example with a structure formula:

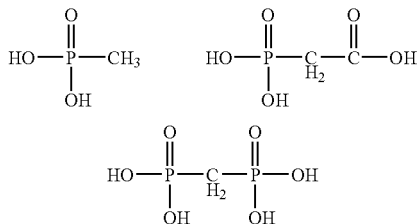

ii) terephthalic acid or carboxylate, which have for example a structure formula:

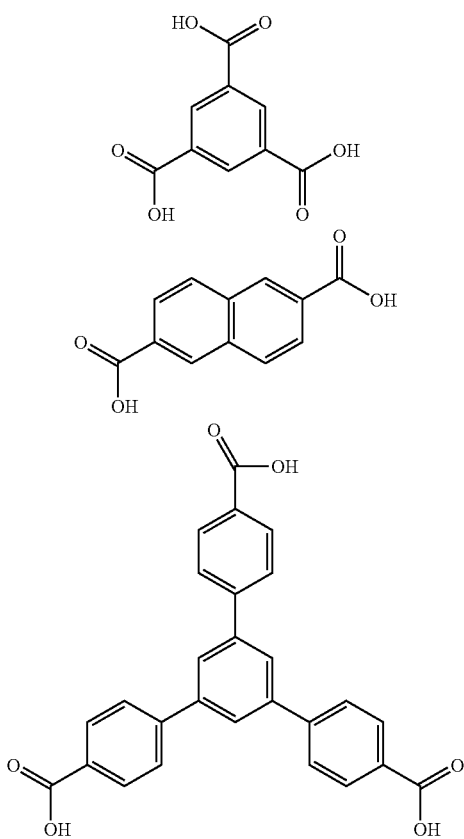

iii) diazabicyclooctane or nitrogen donor complexes, for example with a structure formula:

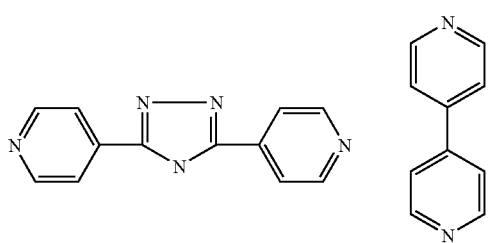

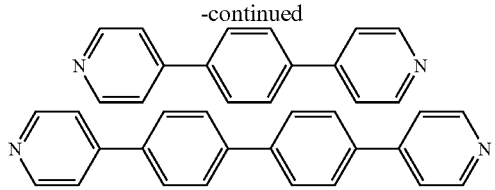

MOF with coordination spots and water molecules on the inside of the pore wall are preferred, just like MOF with coordination spots that are not blocked by the framework structure consisting of ligands.

Both the small size and the organic properties of the porous coordination polymers or complexes improve the interface compatibility with the polymer. The charging of the particles is preferably low in order to form a homogenous composite membrane. It is thus preferred that the particle charge (expressed as a ratio of the weight of the particle to the (weight of the polymer and particle)×100%) is no more than 20% with respect to the polymer content, preferably less than 10, especially no more than 3 wt. %.

Moreover, it is preferred if the particles are well distributed over the polymer layer so that the polymer/particle composition is mainly designed uniformly. For this, it is preferred that the dispersion or solution that contains the particles is or will be well stirred, in particular before a film is poured.

Due to their excellent thermal properties, the membranes based on coordination polymers can be added to the anode as electrolyte membranes in fuel cells at temperatures over 100° C., in particular above 120° C., without additional moistening of the fuel. The procedures for the production of energy into a fuel cell are sufficiently known and familiar to a person skilled in the art.

The fuel cell medium supplied to the anode can be hydrogen, methanol (liquid or gaseous methanol/water mixture) or ethanol (liquid or gaseous ethanol/water mixture).

Higher operating temperatures in the fuel cell enable the reduction of valuable metal charges and the simplification of costly gas conditionings or cleanings, while the demands for liquid supply are reduced, whereby the need to pressurize the system can be avoided.

The invention provides a membrane with a high proton conductivity at temperatures higher than 100° C. without additional liquid supply of the fuel, which is supplied to the anode.

The membrane serves as a barrier to gas/liquid diffusion, wherein however the protons are allowed to pass through. The flow of protons through the electrolyte must be balanced through the flow of the electronic charge through the outer circle, so that this balance creates electrical energy.

The proton movement in the membrane is connected or coupled with the water content of the membrane. Based on the similar properties of methanol and water with its dipole moment, methane molecules like water molecules are transported to the cathode based on the electroosmotic force and diffusion. At the cathode, methanol decreases the fuel cell capacity. The invention provides a membrane with a low permeability for methanol.

The membrane according to the invention combines a high proton conductivity at temperatures higher than 100° C. without additional moistening of the fuel, which is supplied to the anode, and with a suitable methanol permeability.

The invention will be described in greater detail through the following examples. The examples are intended to clarify the invention without restricting the application area in any way.

EXAMPLES

Example 1

Polymer Synthesis

A sulfonated poly(ether ether ketone) (SPEEK) polymer with a sulfonation degree of 51% (ion exchange capacity 1.57 meq/g) was prepared for a method reported on in Wijers M. C., Supported liquid membranes for removal of heavy metals: permeability, selectivity and stability. Dissertation, University of Twente, The Netherlands, 1996. Poly(ether ether ketone), which were provided by Victrex as a granulate, was dried overnight in a vacuum at 90° C. Then, 20 g of the polymer were dissolved in 1 liter of concentrated sulfuric acid (95% to 98%) and stirred for 45 hours at room temperature. The polymer solution was then precipitated in $K_2CO_3$-containing ice water under mechanical stirring until the pH value was neutral. The precipitated polymer was left overnight. The precipitated polymer was then filtered and washed several times with distilled water and dried for 12 hours at 80° C. The sulfonation degree was determined through element analysis, as was described in Nolte R., Ledjeff K., Bauer M., Mulhapt R., Partially sulfonated poly(arylene ether sulfone)—a versatile proton conducting membrane material for modern energy conversion technologies, J. Memb. Sci. 83 (1993) 211-220.

Polymer Cleaning

A polymer suspension containing 18 g of polymer material in 1 liter of water was dried and stirred. The polymer suspension was filtered and washed with distilled water 10 times 24 hours at room temperature. The polymer suspension was then dried for 12 hours at 80° C.

Polymer Membrane Preparation 2.3 g polymer were dissolved in 33 g of dimethyl sulfoxide (7 wt. %). The solution was poured out onto a glass plate at 60° C. for the evaporation of the liquid. Before this, the glass plate was hydrophobized with octadecyltrichlorsilane. After pouring, the SPEEK membrane was dried in a vacuum for 12 hours at 80° C. The final thickness of the membrane was 83 µm. The sulfonated membrane was converted to its acid form by dipping the casted membrane into 2 N sulfuric acid at room temperature for 24 hours followed by dipping in water for 2 times 24 hours in order to ensure a complete washing out of the remaining sulfuric acid.

Example 2

MOF Synthesis

MOF $Cu_3(BTC)_2(H_2O)_3 \cdot xH_2O$ was synthesized as described in Schlichte K., Kratzke T., Kaskel S., Improved synthesis, thermal stability and catalytic properties of the metal-organic framework compound $Cu_3(BTC)_2$, Microporous and Mesoporous Materials 73 (2004), 81-88. 0.857 g (3.6 mmol) $Cu(NO_3)_2 \cdot 3H_2O$ were dissolved in 12 ml of deionized water and were mixed with 0.42 g (2.0 mmol) of trimesic acid, which was dissolved in 12 ml of methanol. The solution was poured into a 40 ml Teflon container, which was placed in an autoclave and heated to 120° C. for 12 hours. The synthesis temperature (120° C.) permitted the suppression of the formation of $Cu_2O$ since the reduction of the $Cu^{2+}$ ions was avoided. The MOF was characterized by nitrogen physisorption and X-ray diffractometry. The nitrogen physisorption measurement was performed at 77 K using a Micromeritics ASAP 2000 Instruments. The X-ray powder diffractogram was recorded with a STOE diffractometer, which was equipped with a position-sensitive detector (Braun, 6°) and a germanium primary ray monochromator in transition mode using a CuKα radiation. An X-ray powder diffractogram of MOF shows reflections, which were compared with a calculated sample made of crystallographic data (the vertical and diagonal O—O distances are each 8.25 and 10.67 Å (angstrom)). The same geometry is achieved for copper atoms, however the corresponding Cu—Cu distances are each 11.3 and 16.0 Å (angstrom). A type I isotherm is observed for the microporous network with a specific microporous volume of 0.41 $cm^3$ g and a Horvath-Kawazoe (HK) pore size of 10.7 Å (angstrom) cylinder model. The thermal stability was examined by TG/DTA. The dissolution of the network took place at 350° C., as already reported in Schlichte K., Kratzke T., Kaskel S., Improved synthesis, thermal stability and catalytic properties of the metal-organic framework compound $Cu_3(BTC)_2$, Microporous and Mesoporous Materials 73 (2004), 81-88.

Example 3

Composite Membrane Preparation 2.3 g polymer were dissolved in 33 g of dimethyl sulfoxide (7 wt. %). 0.12 g MOF were then added to the polymer solution (5 wt. % expressed as weight of MOF/(weight of polymer and MOF)×100%). The solution was stirred for 6 hours and poured out onto a glass plate at 60° C. for the removal of the solvent. Before this, the glass plate was hydrophobized with octadecyltrichlorsilane. After pouring, the SPEEK membrane, containing 5% MOF, was dried in a vacuum furnace for 10 hours at 80° C. The final thickness of the membrane was 96 µm. The sulfonated composite membrane was converted to its acid form by dipping the casted membrane into 2 N sulfuric acid at room temperature for 24 hours followed by an immersion bath in water for 2 times 24 hours in order to ensure a complete fading of the remaining sulfuric acid.

Example 4

Proton Conductivity Measurements

The proton conductivity was measured through the alternating current impedance spectroscopy in the frequency range 10 to $10^6$ Hz at signal amplitudes ≦100 mV and was obtained from the impedance value at zero phase shift (high frequency side). The proton conductivity of the samples was determined at temperatures, which range from 40° C. to 140° C., and at 100% relative humidity. The impedance measurements were performed on stacks with five membranes (similar cumulative thickness of approx. 500 µm). The relative humidity was checked using a rust-free closed steel cell, consisting of two cylindrical inner areas, which are connected together via a tube and were held at different temperatures. The cold inner area contained water, while the hot inner area housed the membrane to be checked. The relative humidity was typically calculated from the ratio between the pressures of the saturated water vapor at temperatures of the cold and the hot compartment.

Nafion® Membrane Preparation 35 g of a 5 wt. % Nafion® solution (DuPont) was poured onto a glass plate at 60° C. for the evaporation of the solvent. Before this, the glass plate was hydrophobized with octadecyltrichlorsilane. After pouring, the Nafion® membrane was dried in a vacuum furnace for 12 hours at 80° C. The final thickness of the membrane was 41 µm.

Composite membranes, which have been prepared with MOFs, have higher proton conductivity values than the simple membranes across all temperature areas, because the MOFs can store water in their hollow spaces. Compared with other organometallic framework structures, in which most of the coordination spots are blocked by framework structures, which receive a ligand, $Cu_3(BTC)_2$ (main pore size 10.7 Å (angstrom)) has the advantage that the Lewis-acid coordination spots and the water molecules (12 water molecules per pore) are on the inside of the pore walls. The $Cu^{2+}$ ions are bound by weak bonds and the remaining coordination spots are filled with weak-bound water molecules, which point towards the inside of the pores. Due to their weak hydrogen-bound structure, separation and connection processes for a proton transport are promoted.

Example 5

Permeabilities of Membranes for Water and Methanol

The water and methanol permeabilities are measured via the membranes through the pervaporation at 55° C. using a milipore cell with 47 mm membrane diameter. A 1.5 M methanol solution was added to the feed side. The permeate side was evacuated. The permeate was collected in a trap, which was submerged in liquid nitrogen, at time intervals between 1 to 3 hours. The amount of permeate was weighed and the composition was determined by gas chromatography. Before the measurements, the membrane samples were submerged in a feed solution. Table 1 shows the results.

TABLE 1

| Membrane | Thickness (μm) | Pervaporation Flow (g/(h m²)) (feed 5.2 wt. % methanol) | |
|---|---|---|---|
| | | Methanol | Water |
| SPEEK | 83 | 110 | 4400 |
| SPEEK + 5% MOF | 96 | 210 | 7000 |

The methanol permeability of the SPEEK membrane with 5 wt. % MOF is higher than that of the simple membrane and even lower than that of Nafion® 115 (see Gaowen Z. and Zhentao Z., Organic/inorganic composite membranes for application in DMFC, J. Memb. Sci. (2005)).

FIG. 1 shows a representation of the proton conductivity of three membranes SPEEK, SPEEK+5% MOF and Nafion® 115 depending on the temperature for SPEED membranes, measured at 100% relative humidity from 40° C. to 140° C. It can be seen in FIG. 1 that the SPEEK membrane with 5% MOF has a clearly or significantly higher proton conductivity (factor 1.5 to over 2) with respect to the two other membranes in the temperature range between 40° C. to 140° C. For example, the proton conductivity of the SPEEK membrane with 5% MOF is approximately $5.0 \times 10^{-2}$ S/cm at 120° C.

What is claimed is:

1. A polymer electrolyte membrane comprising a polymer electrolyte and a metal organic framework (MOF), wherein the MOF comprises an organic linker that includes a phosphonate, a carboxylate group, or a nitrogen donor complex, or a combination thereof.

2. The polymer electrolyte membrane according to claim 1, wherein the polymer electrolyte membrane comprises covalently bonded, negatively charged functional groups.

3. The polymer electrolyte membrane according to claim 1, wherein the polymer electrolyte comprises one or more of a perfluorinated polymer with sulfuric acid and side groups, a sulfonated, phosphonated or doped poly(amide imide), poly(ether sulfone), poly(ether ether ketone), poly(ether ketone ketone), poly(ether imide), poly(phenoxy benzoyl phenylene) and/or poly(benzimidazole) and poly(azole).

4. The polymer electrolyte membrane according to claim 1, wherein the polymer electrolyte comprises a SPEEK [sulfonated poly(ether ether ketone)].

5. The polymer electrolyte membrane according to claim 4, wherein the sulfonation level of the SPEEK is less than 70%.

6. The polymer electrolyte membrane according to claim 1, wherein the MOF has an elementary cell size in the range of about 0.3 to about 15 nm.

7. The polymer electrolyte membrane according to claim 1, wherein the MOF is porous and has coordination spots and water molecules on the inside of pore walls.

8. The polymer electrolyte membrane according to claim 1, wherein the MOF has coordination spots that are not made of MOF ligands.

9. The polymer electrolyte membrane according to claim 1, comprising less than about 20 wt. % MOF based on the combined weight of MOF and polymer electrolyte.

* * * * *